United States Patent
Taylor

(10) Patent No.: US 7,738,228 B2
(45) Date of Patent: Jun. 15, 2010

(54) INVERTER THERMAL PROTECTION

(75) Inventor: Bill Taylor, Bend, OR (US)

(73) Assignee: PV Powered, Inc., Bend, OR (US)

( * ) Notice: Subject to any disclaimer, the term of this patent is extended or adjusted under 35 U.S.C. 154(b) by 1017 days.

(21) Appl. No.: 11/400,775

(22) Filed: Apr. 7, 2006

(65) Prior Publication Data

US 2006/0261830 A1 Nov. 23, 2006

Related U.S. Application Data

(60) Provisional application No. 60/669,487, filed on Apr. 7, 2005.

(51) Int. Cl.
*H02H 5/04* (2006.01)
(52) U.S. Cl. ..................... 361/103
(58) Field of Classification Search ............. 363/95, 363/55; 361/103, 105, 106; 324/760
See application file for complete search history.

(56) References Cited

U.S. PATENT DOCUMENTS

| | | | |
|---|---|---|---|
| 5,299,430 A * | 4/1994 | Tsuchiyama | 62/180 |
| 6,101,073 A | 8/2000 | Takehara | |
| 6,201,180 B1 | 3/2001 | Meyer et al. | |
| 6,320,769 B2 | 11/2001 | Kurokami et al. | |
| 6,593,520 B2 | 7/2003 | Kondo et al. | |
| 6,713,890 B2 | 3/2004 | Kondo et al. | |
| 6,750,391 B2 | 6/2004 | Bower et al. | |
| 6,803,515 B2 | 10/2004 | Itoyama et al. | |
| 6,812,396 B2 | 11/2004 | Makita et al. | |
| 6,856,497 B2 | 2/2005 | Suzui et al. | |
| 6,897,370 B2 | 5/2005 | Kondo et al. | |
| 6,912,133 B2 * | 6/2005 | Kazem | 361/752 |
| 2001/0023703 A1 | 9/2001 | Kondo et al. | |
| 2002/0085325 A1 | 7/2002 | Suzui et al. | |
| 2002/0105765 A1 | 8/2002 | Kondo et al. | |
| 2002/0186020 A1 | 12/2002 | Kondo et al. | |
| 2002/0195138 A1 | 12/2002 | Itoyama et al. | |
| 2003/0067723 A1 | 4/2003 | Suzui et al. | |
| 2003/0075211 A1 | 4/2003 | Makita et al. | |
| 2003/0111103 A1 | 6/2003 | Bower et al. | |
| 2004/0196678 A1 * | 10/2004 | Yoshimura et al. | 363/79 |
| 2005/0045224 A1 | 3/2005 | Lyden | |

* cited by examiner

*Primary Examiner*—Bao Q Vu
*Assistant Examiner*—Jue Zhang
(74) *Attorney, Agent, or Firm*—Perkins Coie LLP

(57) ABSTRACT

An inverter has three redundant modes of thermal protection providing fire protection and secures protection of the inverter from thermal damage. An embodiment of the present invention is disclosed wherein thermal transducers or actuators are located on a control circuit board, a heat sink, and a power circuit board. Two of the modes of thermal protection are active and one is passive.

16 Claims, 2 Drawing Sheets

INVERTER THERMAL PROTECTION

RELATED APPLICATIONS

This application claims priority under 35 U.S.C. §119(e) to U.S. Provisional Patent Application No. 60/669,487 which was filed on Apr. 7, 2005. Co-pending patent application Ser. No. 11/187,059 is also incorporated herein by reference.

FIELD OF THE INVENTION

The invention relates thermal protection of an inverter, specifically to redundant thermal protection of a grid-connected inverter.

BACKGROUND OF THE INVENTION

The solar energy industry is expanding at a rapid pace. Much of that expansion is due to increases in residential and small commercial photovoltaic (PV) installations. Increasingly these installations are directly connected to the utility grid without the use of batteries. Inverters are the power electronics equipment that converts DC electricity produced by PV panels (collectively a PV array) into AC required by the grid.

Thermal requirements are a major element in the design of inverters. An inverter's output power rating is often determined by insulation ratings and other thermal limitations. Thus, inverters are often designed to closely approach these limitations in order to get the most out of a given piece of hardware. Furthermore, inverters are often located on residential structures and therefore must not pose any significant fire risk. It would be advantageous to provide an inverter with redundant thermal protection systems limiting the risk of damage to the inverter and the risk of fire.

SUMMARY OF THE INVENTION

The present invention provides an inverter with three separate modes of thermal protection. A first mode of thermal protection is an active one in which temperature is monitored by a digital signal processor (DSP) or computer chip on a control circuit board located at the top of an inverter enclosure. If the temperature on the control circuit board exceeds a maximum circuit board temperature set-point, the inverter will stop operation for twenty minutes then recommence operation if the temperature on the circuit board has fallen below the maximum circuit board temperature set-point.

A second mode of thermal protection is an active one similar to the first mode in which temperature on a heat sink is monitored by a digital signal processor (DSP) or computer chip. If the temperature on the heat sink exceeds a maximum heat sink temperature set-point the inverter will stop operation for twenty minutes and then recommence operation if the temperature at the heat sink has fallen below the second set-point.

A third mode of thermal protection is a passive one in which a bi-metal thermal switch is connected such that when the switch is triggered contactors connecting the inverter to the grid will open, effectively shutting down the inverter. Only after the thermal switch has cooled significantly will it reset, reconnecting the inverter to the grid.

Additional features and advantages according to the invention in its various embodiments will be apparent from the remainder of this disclosure.

BRIEF DESCRIPTION OF THE DRAWINGS

Features and advantages according to embodiments of the invention will be apparent from the following Detailed Description taken in conjunction with the accompanying drawings, in which.

DETAILED DESCRIPTION OF THE DRAWINGS

A method of redundant inverter thermal protection is disclosed herein. Embodiments of that method are further disclosed using a specific circuit and inverter. The description of specific embodiments herein is for demonstration purposes and in no way limits the scope of this disclosure to exclude other not specifically described embodiments of the method of the present invention.

Figure 1:
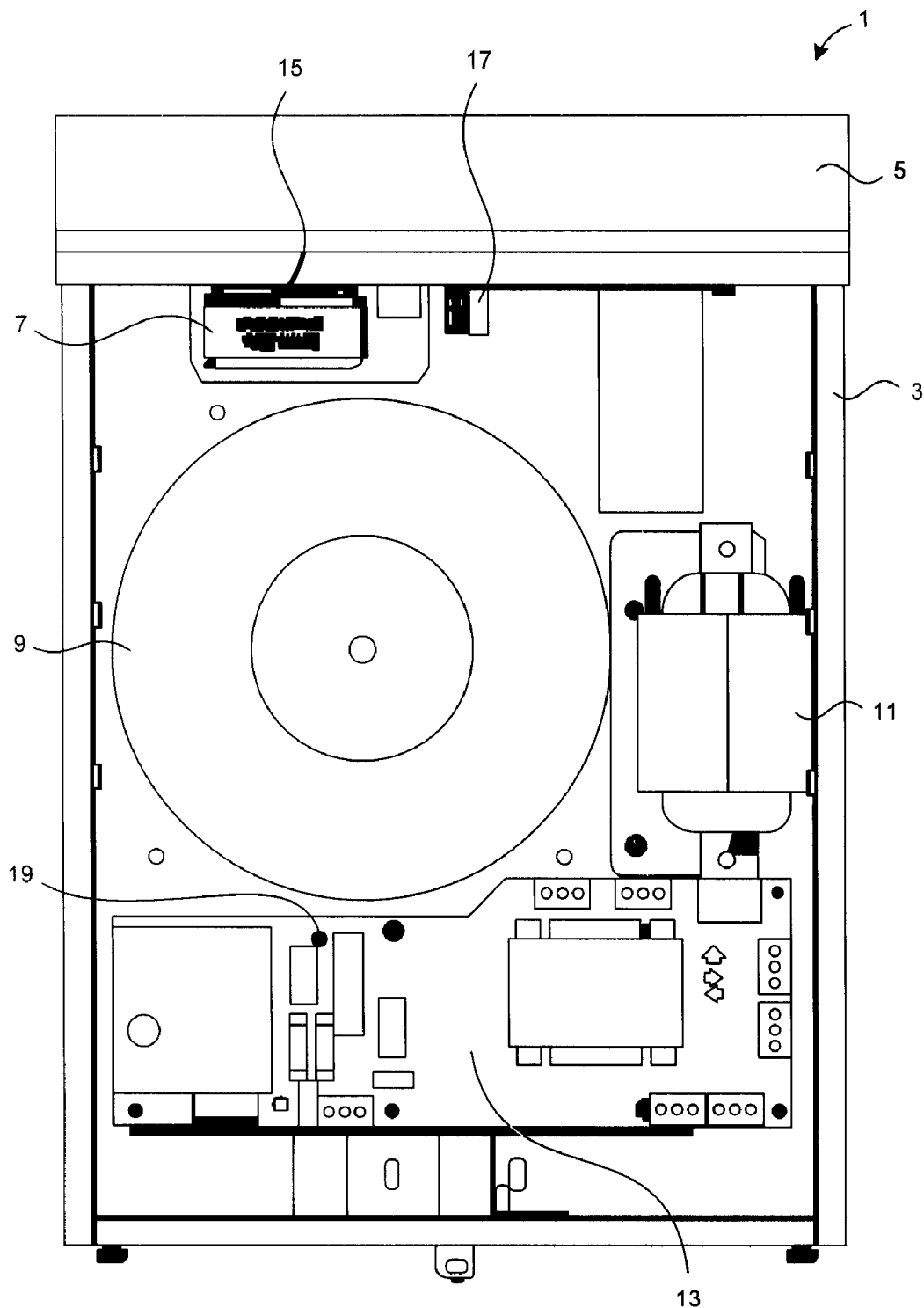
FIG. 1 shows the location of the three temperature sensors in an inverter according to embodiments of the present invention.

FIG. 1 shows the physical layout of an inverter 1 according to embodiments of the present invention. Shown elements of the inverter 1 include an enclosure 3, a heat sink 5, a control circuit board 7, a transformer 9, an inductor 11, and a power circuit board 13. An inverter 1 of the present invention has temperature sensors at multiple locations within the inverter 1. Temperature sensors may include integrated circuit temperature sensors, thermistors, thermocouples, bi-metal thermal switches, or any other thermal transducer or actuator. The use of more than one type of thermal transducer or actuator will add to the redundancy of thermal protection, especially if there are both active and passive modes of thermal protection.

The specifically described embodiment shown in FIG. 1 has an integrated circuit temperature sensor 15 on the control circuit board 7, a thermister 17 on the heat sink 5, and a bimetal switch 19 on the power circuit board 13. The control circuit board 7 is located at the top of the inverter enclosure 3, a temperature transducer at this location is well suited to measure maximum ambient temperature within the enclosure 3. An excessively hot ambient temperature or excessively hot control circuit board 7 may result in damage to the inverter 1. The heat sink 5 is where the bulk of the heat generated by the inverter 1 is rejected. Components of the inverter that generate a significant amount of heat, such as transistors, may be directly thermally connected to the heat sink 5. A temperature transducer monitoring the temperature of the heat sink 5 is a good indicator of thermal performance of the inverter 1 as a whole. An excessively hot heat sink 5 will result in damage to the inverter 1. The power circuit board 13 is a good place to locate a passive thermal actuator or switch since that is a location where the inverter 1 may be disconnected from outside power.

Figure 2:
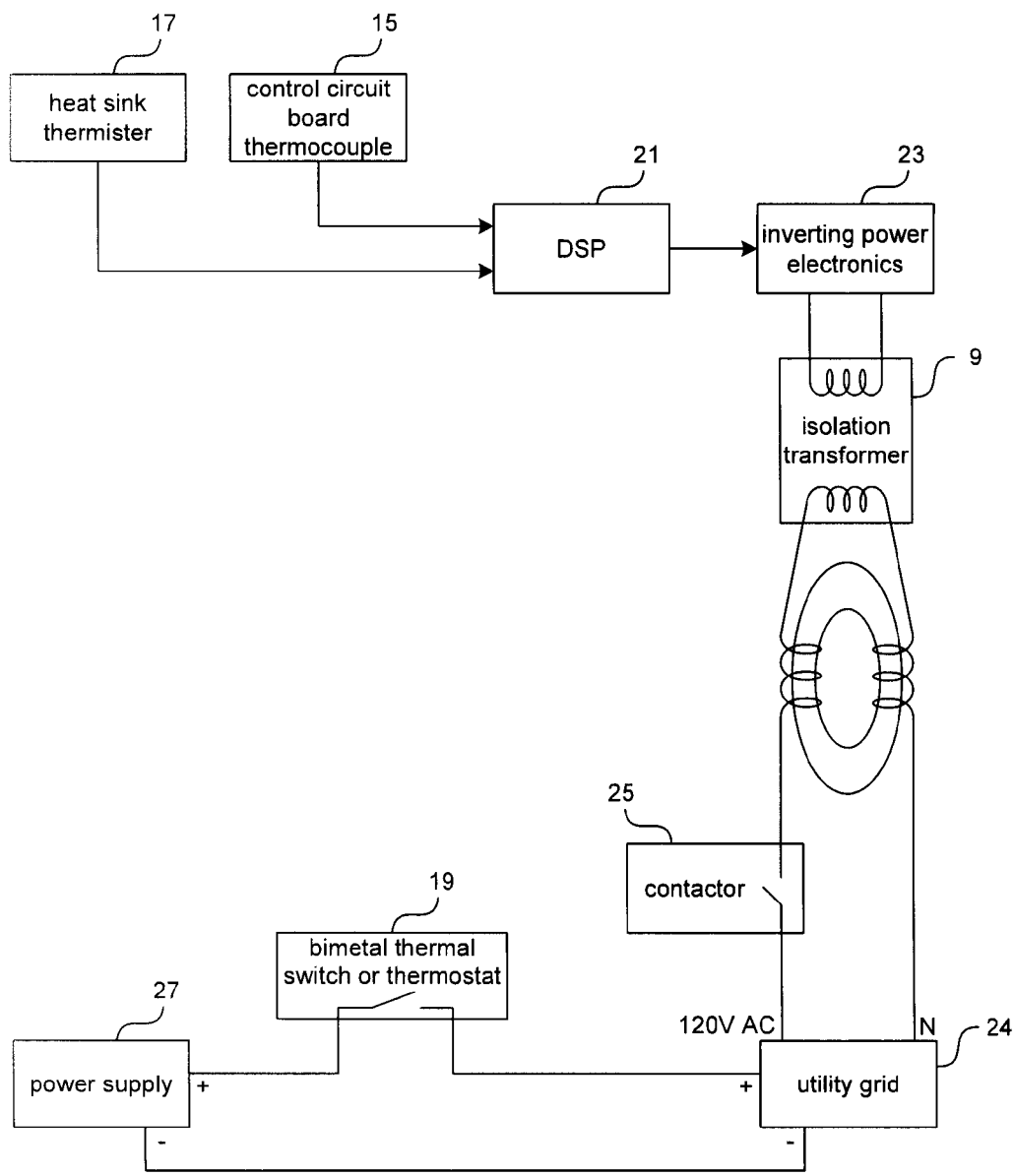
FIG. 2 shows a block diagram of operation of thermal protection modes according to embodiments of the present invention.

FIG. 2 shows a schematic of thermal protection circuitry for an inverter 1 according to an embodiment of the present invention. A heat sink thermister 17 sends a temperature signal to a digital signal processor (DSP) 21. When the temperature of the heat sink exceeds a maximum heat sink temperature set-point (90° C. in one embodiment), the DSP 21 signals the active inverting power electronics 23 in the inverter 1 to cease converting DC power to AC power. In one embodiment, the active inverting power electronics 23 are a pulse width modulated IGBT module 23. After a set period of time (20 minutes in one embodiment), if the temperature of the heat sink 5, as indicated by the signal from the heat sink thermister 17, has dropped below the maximum heat sink temperature set-point, the DSP 21 sends a signal to the active inverting power electronics 23 to recommence converting DC power to AC power.

A control circuit board integrated circuit temperature sensor 15 sends a temperature signal to the DSP 21. When the temperature of the control circuit board exceeds a maximum control circuit board temperature set-point (95° C. in one embodiment), the DSP 21 signals the active inverting power electronics 23 in the inverter 1 to cease converting DC power to AC power. After a set period of time (20 minutes in one embodiment), if the temperature of the control circuit board 7, as indicated by the signal from the control circuit board thermocouple 15, has dropped below the maximum control circuit board temperature set-point the DSP 21 sends a signal to the active inverting power electronics 23 to recommence converting DC power to AC power.

Both of the above described modes of thermal protection are active. The DSP 21 senses the signal from either the control circuit board thermocouple 15 or the heat sink thermister 17 and actively signals a shut down of the active inverting power electronics 23. The active inverting power electronics 23 and thus the inverter 1 is still connected to a utility grid 24. In one embodiment, power flows from the active power electronics 21 through an isolation transformer 9, through an inductor 11, and then through a contactor 25 before it reaches the utility grid 24. Though the contactor 25 may disconnect the inverter electrically from the utility grid, 24 it is not necessarily activated by two modes of thermal protection described above.

For fire protection and as a failsafe last line of thermal protection, a passive mode is preferable. In one embodiment, the contactor 25 is a normally open device. The contactor 25 is caused to close and stay closed by the presence of a voltage at control terminals on the contactor 25. The voltage is provided by a power supply 27 of a suitable voltage for the type of contactor used (five volts in one embodiment). The voltage to the contactor may be interrupted by the activation of a bimetal thermal switch (or thermostat) 19 that is located on the power circuit board 13. In one embodiment, the thermostat 19 is set to open, or interrupt the voltage to the contactor 25, at a temperature of 105° C. and reclose at a temperature of 90° C. This final described mode of thermal protection will work even if the DSP 21 is malfunctioning or if there is an electrical short or other heat generating problem at a location electrically between the active inverting power electronics 23 and the grid 24 such that a signal from the DSP 21 commanding the active inverting power electronics 23 to cease converting DC power to AC power would not remove the source of energy (the grid 24) from the problem.

While an embodiment of the invention has been shown and described, it will be apparent to those skilled in the art that various modifications may be made without departing from the scope of the invention. Therefore, it is intended that the invention not necessarily be limited to the particular embodiments described and illustrated herein.

What is claimed is:

1. An inverter connected to a photovoltaic panel comprising:
    a chassis with a top, a bottom, two sides, a front, and a back;
    inverter circuitry attached to said chassis;
    at least two temperature sensors located at two different locations within said chassis;
    devices associated with each of said temperature sensors for interrupting operation of said inverter if a temperature measured by at least one of said temperature sensors exceeds a predetermined value; and
    a set of electrical cables that connect said inverter circuitry to an alternating current (AC) power grid and a switch in said cables for disconnecting said inverter circuitry from said AC power grid wherein at least one of said temperature sensors and its respective device for interrupting operation of said inverter is located near said switch.

2. The inverter of claim 1 wherein at least one of said temperature sensors and its respective device for interrupting operation of said inverter is a passive sensor and device.

3. The inverter of claim 2 comprising three temperature sensors and three devices associated with said temperature sensors for interrupting operation of said inverter.

4. The inverter of claim 1 wherein at least one of said temperature sensors is located near the top of said chassis and at least one of said temperature sensors is located near the bottom of said chassis.

5. The inverter of claim 2 wherein at least one of said temperature sensors is located near the top of said chassis and at least one of said temperature sensors is located near the bottom of said chassis.

6. The inverter of claim 3 wherein at least one of said temperature sensors is located near the top of said chassis and at least one of said temperature sensors is located near the bottom of said chassis.

7. The inverter of claim 4 wherein said at least one of said temperature sensors and its respective device for interrupting operation of said inverter that is located near the bottom of said chassis is a passive sensor and device.

8. The inverter of claim 1 further comprising a heat sink located at the top of said chassis and wherein at least one of said temperature sensors is mounted on said heat sink to monitor the temperature thereof.

9. The inverter of claim 1 further comprising a control circuit board with a temperature sensor mounted on said control circuit board to monitor the temperature thereof.

10. The inverter of claim 1 further comprising a power circuit board with a temperature sensor mounted on said power circuit to monitor the temperature thereof.

11. The inverter of claim 10 wherein said power circuit board is mounted in said chassis near the bottom of said chassis.

12. The inverter of claim 10 wherein said temperature sensor mounted on said power circuit board and its respective device for interrupting operation of said inverter is a passive sensor and device.

13. The inverter of claim 12 wherein said temperature sensor mounted on said power circuit board is a bi-metal thermostat.

14. The inverter of claim 1 wherein at least one temperature sensor and its respective device for interrupting operation of said inverter located near said switch opens said switch when the measured temperature exceeds a predetermined value.

15. The inverter of claim 14 wherein said at least one temperature sensor and its respective device for interrupting operation of said inverter located near said switch is a passive sensor and device.

16. The inverter of claim 15 wherein said at least one temperature sensor located near said switch is a bi-metal thermostat.

* * * * *